A. A. ROSS.
Churn.
No. 80,507.
Patented July 28, 1868.
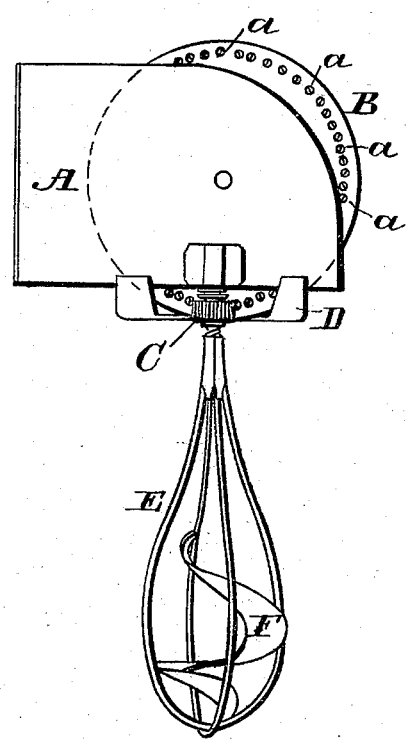
Witnesses:
Harry King
Leopold Everts
Inventor:
Austin A. Ross
per
Alexander Mason
Atty

United States Patent Office

AUSTIN A. ROSS, OF HORICON, NEW YORK.

*Letters Patent No. 80,507, dated July 28, 1868.*

IMPROVEMENT IN CHURN.

The Schedule referred to in these Letters Patent and making part of the same.

TO ALL WHOM IT MAY CONCERN:

Be it known that I, AUSTIN A. Ross, of Horicon, in the county of Warren, and in the State of New York, have invented certain new and useful Improvement in Churns; and do hereby declare that the following is a full, clear, and exact description thereof, reference being had to the accompanying drawings, and to the letters of reference marked thereon.

The nature of my invention consists in a churn-dasher constructed of tin and wire, and operated by means of gearing, the more easily to make butter, and arranged so as to be easily taken apart for the purpose of cleaning.

In order to enable others skilled in the art to make and use my invention, I will now proceed to describe its construction and operation.

In the annexed drawings, forming part of this specification—

A represents a bar, or other suitable arrangement, which is to be fastened to a casing or partition, and to which the driving-wheel B is secured.

This wheel is provided on its inner side, near its periphery, with cogs $a\ a$, which cogs fit into the cogged dash-wheel C, which latter is placed under the bar A, and rests on a guard, D.

Said dash-wheel C is provided with a nut on its lower side, which projects through and below the said guard.

The dasher E consists of wire, joined together at top in an iron thimble, which is provided with screw-threads on its outside, to fit into the nut on the dash-wheel, and said wires are bent outwards on all sides, towards the bottom, and there joined together at the centre.

Inside of this wire casing thus formed is a tin plate, F, placed, which is cut and twisted in the shape of a screw, and serves to pump the cream from the bottom.

Having thus fully described my invention, what I claim as new, and desire to secure by Letters Patent, is—

The churn-dasher E, when constructed as described, of wire and a tin screw, F, and provided with a screw in its upper end, in combination with the dash-wheel C, constructed and operating substantially as and for the purposes herein set forth.

In testimony that I claim the foregoing, I have hereunto set my hand, this 17th day of May, 1868.

AUSTIN A. ROSS.

Witnesses:
A. N. MARR,
J. N. BARTON.